United States Patent
Bonny et al.

(10) Patent No.: US 9,435,417 B1
(45) Date of Patent: *Sep. 6, 2016

(54) AUTOMATIC TORQUE COMPENSATING DRIVE SYSTEM

(71) Applicant: Hydro-Gear Limited Partnership, Sullivan, IL (US)

(72) Inventors: Nathan W. Bonny, Shelbyville, IL (US); K. Mike McCoy, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/456,544

(22) Filed: Aug. 11, 2014

Related U.S. Application Data

(63) Continuation of application No. 13/666,654, filed on Nov. 1, 2012, now Pat. No. 8,800,694.

(60) Provisional application No. 61/554,228, filed on Nov. 1, 2011.

(51) Int. Cl.
| | |
|---|---|
| *B60K 17/00* | (2006.01) |
| *B62D 11/02* | (2006.01) |
| *B62D 11/18* | (2006.01) |
| *F16H 39/00* | (2006.01) |
| *B60W 10/10* | (2012.01) |
| *B60W 10/04* | (2006.01) |

(52) U.S. Cl.
CPC ............. *F16H 39/00* (2013.01); *B60W 10/04* (2013.01); *B60W 10/10* (2013.01); *B62D 11/02* (2013.01); *B62D 11/18* (2013.01)

(58) Field of Classification Search
CPC ............................. B62D 11/02; B62D 11/18
See application file for complete search history.

(56) References Cited

U.S. PATENT DOCUMENTS

| | | |
|---|---|---|
| 2,886,944 A | 2/1956 | Zelina |
| 3,214,911 A | 11/1965 | Kempson |
| 3,243,959 A | 4/1966 | Fantom |
| 3,319,419 A | 5/1967 | Hann |
| 3,349,860 A | 10/1967 | Ross |
| 3,354,978 A | 11/1967 | Buczich |
| 3,400,635 A | 9/1968 | Pool et al. |
| 3,477,225 A | 11/1969 | Cryder et al. |
| 3,526,288 A | 9/1970 | Cryder et al. |
| 3,563,109 A | 2/1971 | Glass et al. |
| 3,650,107 A | 3/1972 | Court |
| 3,734,225 A | 5/1973 | Kobald et al. |
| 3,938,401 A | 2/1976 | Bauer |
| 3,942,486 A | 3/1976 | Kirchner |
| 3,943,712 A | 3/1976 | Stuhr |
| 3,968,706 A | 7/1976 | Bauer |
| 4,108,265 A | 8/1978 | Abels |
| 4,546,847 A | 10/1985 | Abels |
| 4,768,340 A | 9/1988 | Hamilton |

(Continued)

*Primary Examiner* — Tony Winner
(74) *Attorney, Agent, or Firm* — Neal, Gerber & Eisenberg LLP

(57) ABSTRACT

An automatic torque compensating drive system for a hydrostatic transmission, having a torque compensating control mechanism adjusting the swash plate of the hydraulic motor, the swash plate being spring biased to a low-torque, high-speed position and rotatable through a range of positions to a high-torque, low-speed position in response to increasing hydraulic system pressure. When used with a pair of transmissions, a linkage may join the control mechanisms of each transmission to synchronize their torque adjustments.

23 Claims, 14 Drawing Sheets

(56) References Cited

U.S. PATENT DOCUMENTS

| | | | |
|---|---|---|---|
| 4,843,817 A * | 7/1989 | Shivvers | F16H 39/10 |
| | | | 180/272 |
| 5,094,077 A | 3/1992 | Okada | |
| 5,378,127 A * | 1/1995 | Welscher | F04B 49/22 |
| | | | 417/506 |
| 5,836,160 A | 11/1998 | Chung | |
| 5,894,899 A | 4/1999 | Ashcroft et al. | |
| 6,151,895 A | 11/2000 | Matsura | |
| 6,616,559 B1 | 9/2003 | Hori et al. | |
| 6,668,549 B2 | 12/2003 | Yano et al. | |
| 6,729,115 B2 | 5/2004 | Bartel | |
| 7,210,294 B1 | 5/2007 | Langenfeld et al. | |
| 7,373,871 B1 | 5/2008 | Buescher | |
| 7,487,636 B1 | 2/2009 | Wigness et al. | |
| 7,987,941 B2 | 8/2011 | Shirao et al. | |
| 2002/0128108 A1 * | 9/2002 | Jolliff | B60K 17/105 |
| | | | 475/198 |
| 2008/0179128 A1 | 7/2008 | Iwaki et al. | |
| 2009/0301076 A1 | 12/2009 | Yasuda et al. | |
| 2010/0107866 A1 | 5/2010 | Nelson | |

* cited by examiner

AUTOMATIC TORQUE COMPENSATING DRIVE SYSTEM

CROSS-REFERENCE TO RELATED APPLICATIONS

This application is a continuation of U.S. patent application Ser. No. 13/666,654, filed on Nov. 1, 2012, now U.S. Pat. No. 8,800,694, which claims the benefit of Provisional Application Ser. No. 61/554,228, filed Nov. 1, 2011, which are incorporated herein by reference in their entirety.

BACKGROUND OF THE INVENTION

This application is related to drive systems for utility vehicles having a prime mover powering the drive system and an auxiliary function, e.g. a pair of hydrostatic transmissions propelling a zero-turn vehicle with a mowing deck. It is desirable that the power directed to the auxiliary function remain constant to produce uniform results, such as a constant blade speed on a mowing deck to provide an even cut. It is further desirable to maintain an overall, constant power output by the prime mover to manage energy consumption. Working against these desired outcomes, increasing demands on the drive system, e.g. terrain of increasing slope, may require the utility vehicle to apportion greater amounts of power from the prime mover to the drive system and away from the auxiliary function, lessening the quality of the auxiliary function. Alternatively, the prime mover may be called upon to provide greater amounts of power to the drive system and the auxiliary function, increasing the utility vehicle's overall energy consumption. A means for adjusting the torque output of the drive system to compensate for increasing demands, while roughly maintaining a constant power draw from the prime mover is desirable.

Torque compensation has been accomplished in the past by manual methods requiring an operator to shift a transmission or motor to a greater mechanical or hydraulic reduction to accomplish an increased torque output as load increases. Such a transition can be abrupt, leading to undesirable ride quality. Automatic torque compensation has been accomplished via hydraulically actuated shift mechanisms piloted by valves reacting to increasing system pressure, and by electrically actuated shift mechanisms in communication with pressure transducers. All of these control methods add complexity and cost not suitable to certain utility vehicles, such as riding mowers.

SUMMARY OF THE INVENTION

The present invention addresses these competing demands by utilizing a drive system having a pair of torque compensating control mechanisms that automatically shift a pair of transmissions through a continuous output range from a low-torque, high-speed mode to a high-torque, low-speed mode as the transmissions experience increasing loads. Thus, under conditions falling within a vehicle's expected duty cycle, power output from the prime mover to the transmissions remains roughly constant as demand changes, allowing the power delivery to an auxiliary function to likewise remain constant.

The present invention may be used with a pair of hydrostatic transmissions, each consisting of a variable speed hydraulic pump subject to manual control, and a variable speed hydraulic motor subject to an automatic torque compensating control mechanism. These control mechanisms take advantage of the natural tendency of a swash plate to seek a full-stroke position as increasing load, manifested as increasing system pressure, rotates the swash plate of the hydraulic motor from a partial-stroke position that corresponds to the low-torque, high-speed mode through a continuous range of positions to the full-stroke position, which corresponds to the high-torque, low-speed mode. This change of position occurs as increasing system pressure in the pistons acts against a thrust bearing located in the swash plate, pivoting the swash plate about its axis of rotation. The swash plate of each hydraulic motor is biased to the partial-stroke position by a spring bias element, allowing the control mechanism to automatically adjust the torque output of the transmission as system pressure, i.e. load, varies. In one embodiment, a pair of stops limits the rotation of the swash plates. Thus, automatic torque compensation is accomplished without needless complexity or cost.

A first objective of the present invention is to accomplish torque compensation in the drive system via a pair of external, spring bias elements acting on the swash plates of the respective hydraulic motors through a camshaft extending out of each transmission's housing. A further objective of the present invention is to link the torque compensating control mechanisms of each transmission to synchronize their torque adjustments. Another objective of the present invention is to accomplish torque compensation via a pair of internal, spring bias elements acting on the swash plates of the respective hydraulic motors.

While the above description has been in connection with a pair of transaxles, it will be understood that the inventions described herein may also be used in other applications, including a single transaxle having a single output axle for other non-vehicle applications or a transaxle for a vehicle such as a lawn tractor and having a pair of output axles extending from opposite sides thereof, such as is shown in commonly owned U.S. Pat. Nos. 7,210,294 and 7,373,871, the terms of which are incorporated herein by reference.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
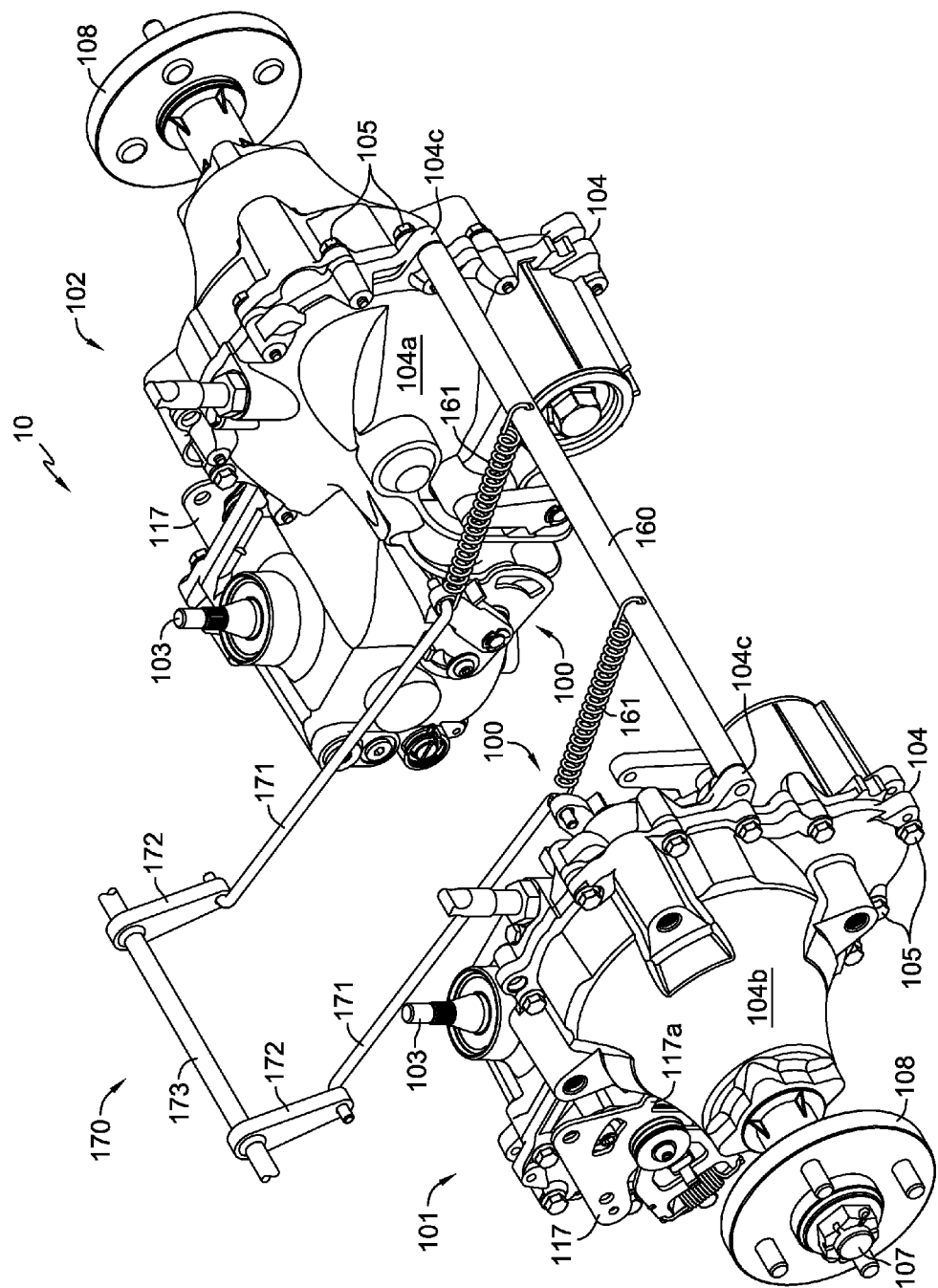
FIG. 1 is an isometric view of a first embodiment of an automatic torque compensating drive system in accordance with the principles of the invention, where each transmission is biased to a low-torque, high speed mode.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. For example, the motor swash plates in the two drive system embodiments disclosed herein are serially numbered as 119 and 219, respectively, to ease recognition. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art.

The description that follows illustrates representative embodiments of automatic torque compensating drive systems in accordance with the principles of the invention. Each drive system has a unique pair of torque compensating control mechanisms acting upon the hydraulic motors of a pair of hydrostatic transmissions. It should be noted that the term 'transmission' is used interchangeably herein to represent both transmissions and transaxles, the latter having a final output axle. The design, layout and function of the exemplary hydrostatic transmissions depicted herein can be substantially similar to that illustrated in commonly-owned U.S. Pat. No. 7,487,636, the terms of which are incorporated by reference herein, and as such, only differences will be described in detail. The primary difference between the transmissions illustrated in U.S. Pat. No. 7,487,636 and those illustrated herein is the presence of an adjustment mechanism associated with the swash plate of the hydraulic motor, whereby the hydraulic motor has a variable displacement as opposed to a fixed displacement.

Figure 9:
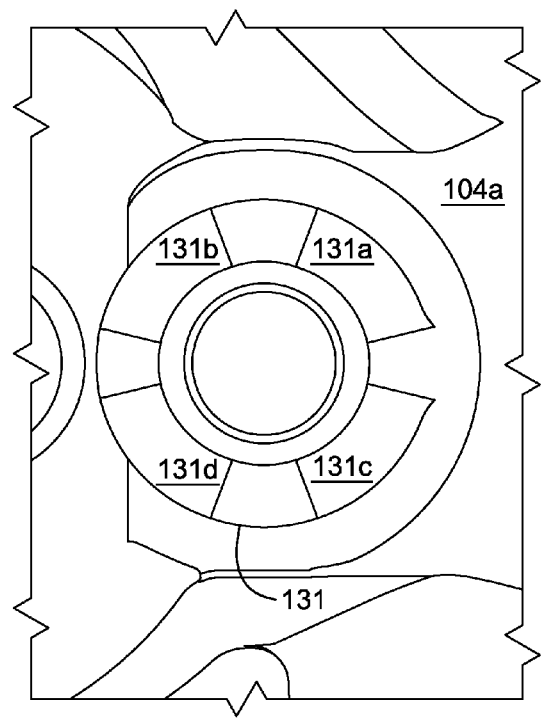
FIG. 9 is a side elevation view of the ramped housing pocket of FIG. 8.
Figure 10:
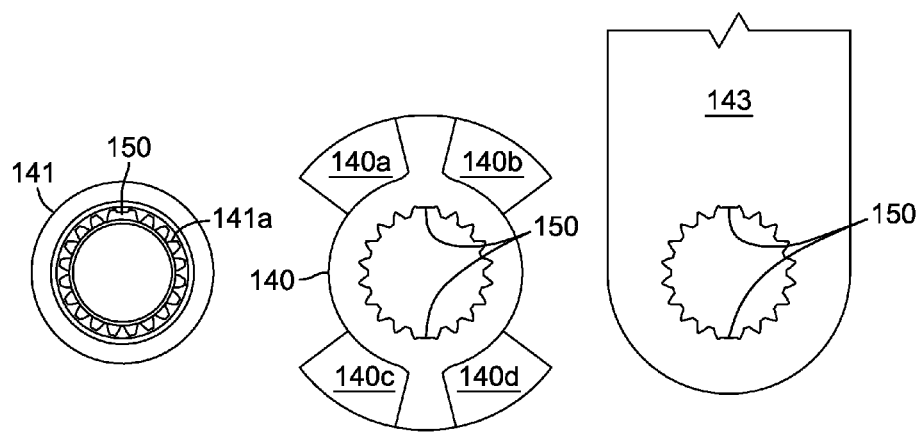
FIG. 10 provides a side elevation view of cooperating components of the hydraulic motor shift mechanism of FIG. 8, namely the camshaft, the cam (from the reverse side depicted therein), and a portion of the shift lever, each component having a clocking feature incorporated into its spline.
Figure 11:
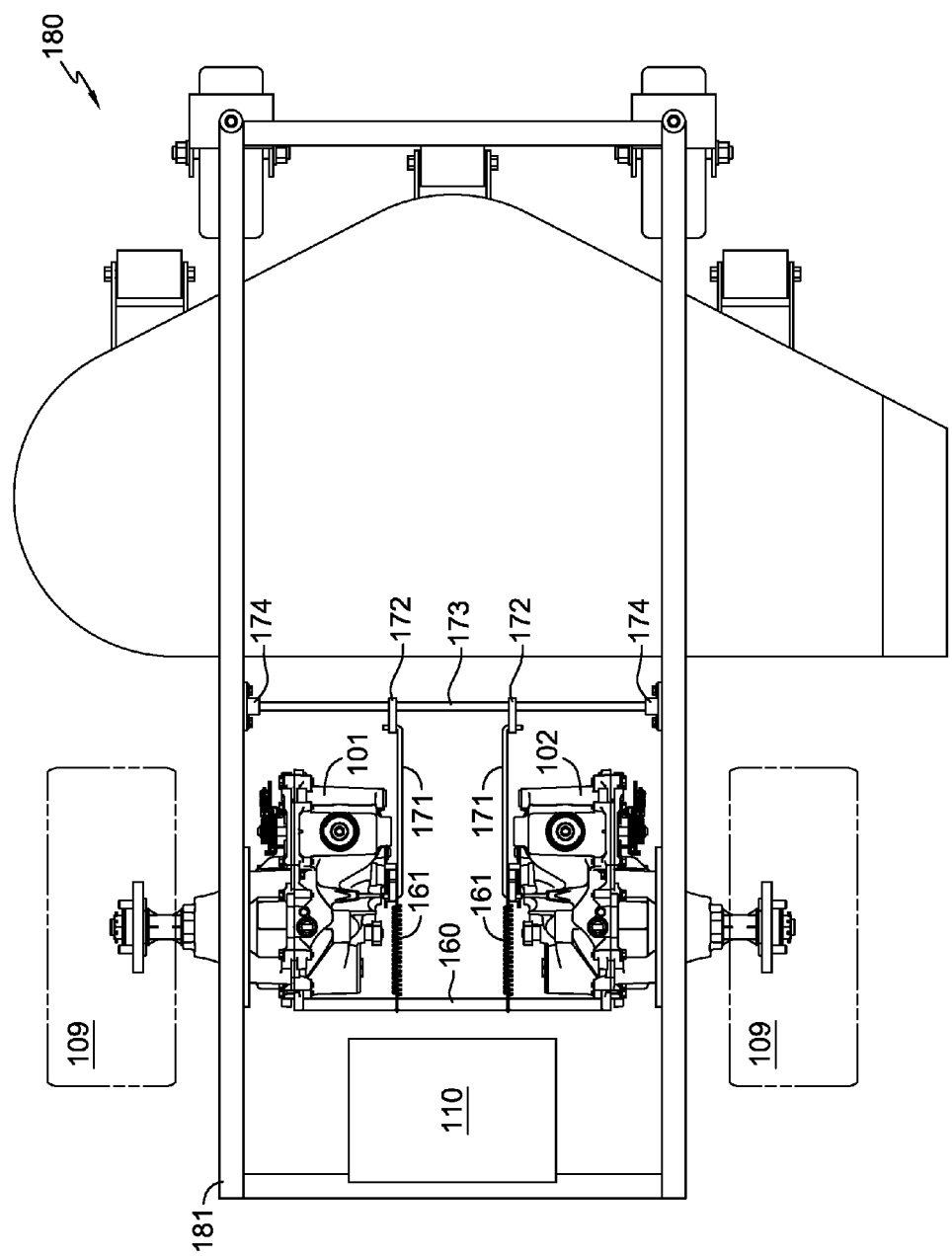
FIG. 11 is a top view of a zero-turn mower incorporating the first embodiment of the automatic torque compensating drive system with certain transmission and vehicle elements removed for clarity.
Figure 12:
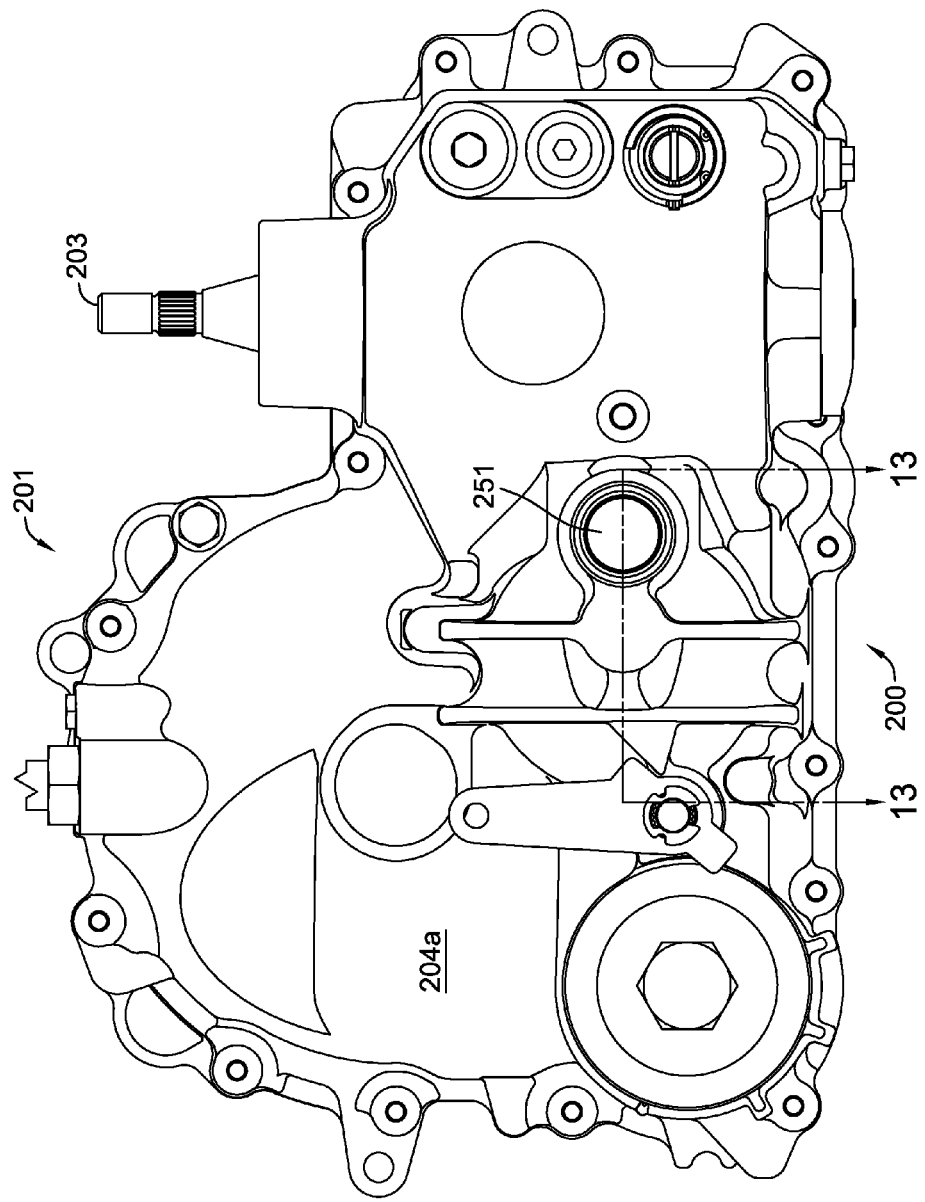
FIG. 12 is side elevation view of an exemplary hydrostatic transmission incorporating an internal torque compensating control mechanism in accordance with the principles of the invention.

FIGS. 1-10 illustrate a first embodiment of an automatic torque compensating drive system 10 for a utility vehicle, the drive system 10 having a left-side transmission 101 and a right-side transmission 102, with each transmission 101, 102 having a torque compensating control mechanism 100. The transmissions 101, 102 are left-hand and right-hand versions of substantially similar transmissions, whereby the various control and actuator arms of each transmission move in mirror-image fashion. Each transmission is disposed in a housing 104 consisting of a main housing 104a and a side housing 104b, the housing members joined by a plurality of fasteners 105 and sealed in a known manner, such as a liquid sealant or a flexible gasket. The transmissions 101, 102 include a variable displacement hydraulic pump 111 and variable displacement hydraulic motor 112 disposed on a common center section 120. Each transmission 101, 102 may further comprise a planetary reduction (not shown) drivingly engaged to the motor shaft 106 and an output axle 107. Other gear reductions, such as a series of spur gears, are contemplated within the scope of the invention. A wheel hub 108 engaged to the output axle 107 transfers torque from the transmission 101, 102 to a vehicle wheel 109 (as depicted in FIG. 11).

Figure 4:
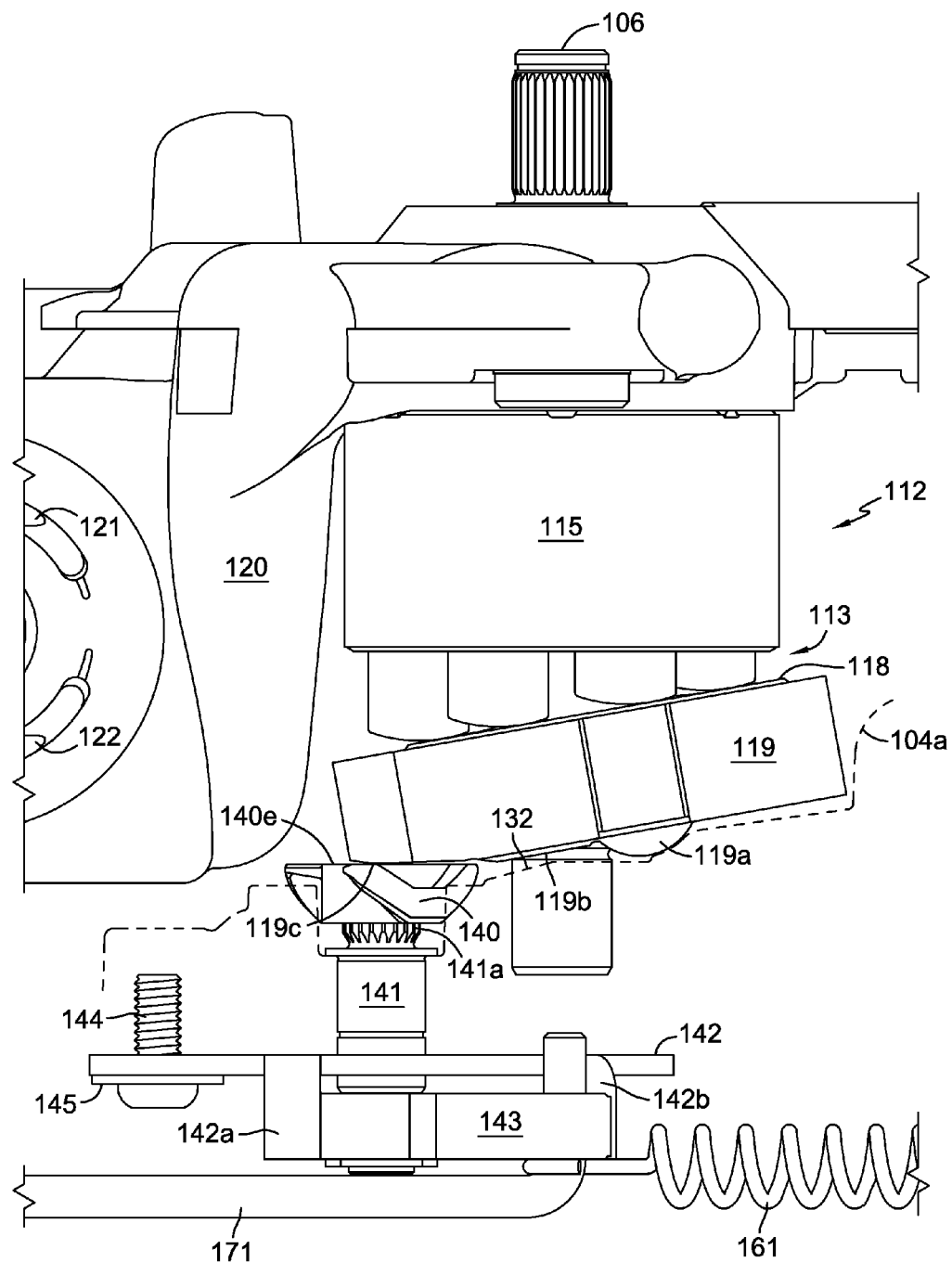
FIG. 4 is a top view of the right-side transmission of FIG. 2 illustrating details of the torque compensating control mechanism with certain transmission elements removed for clarity.
Figure 5:
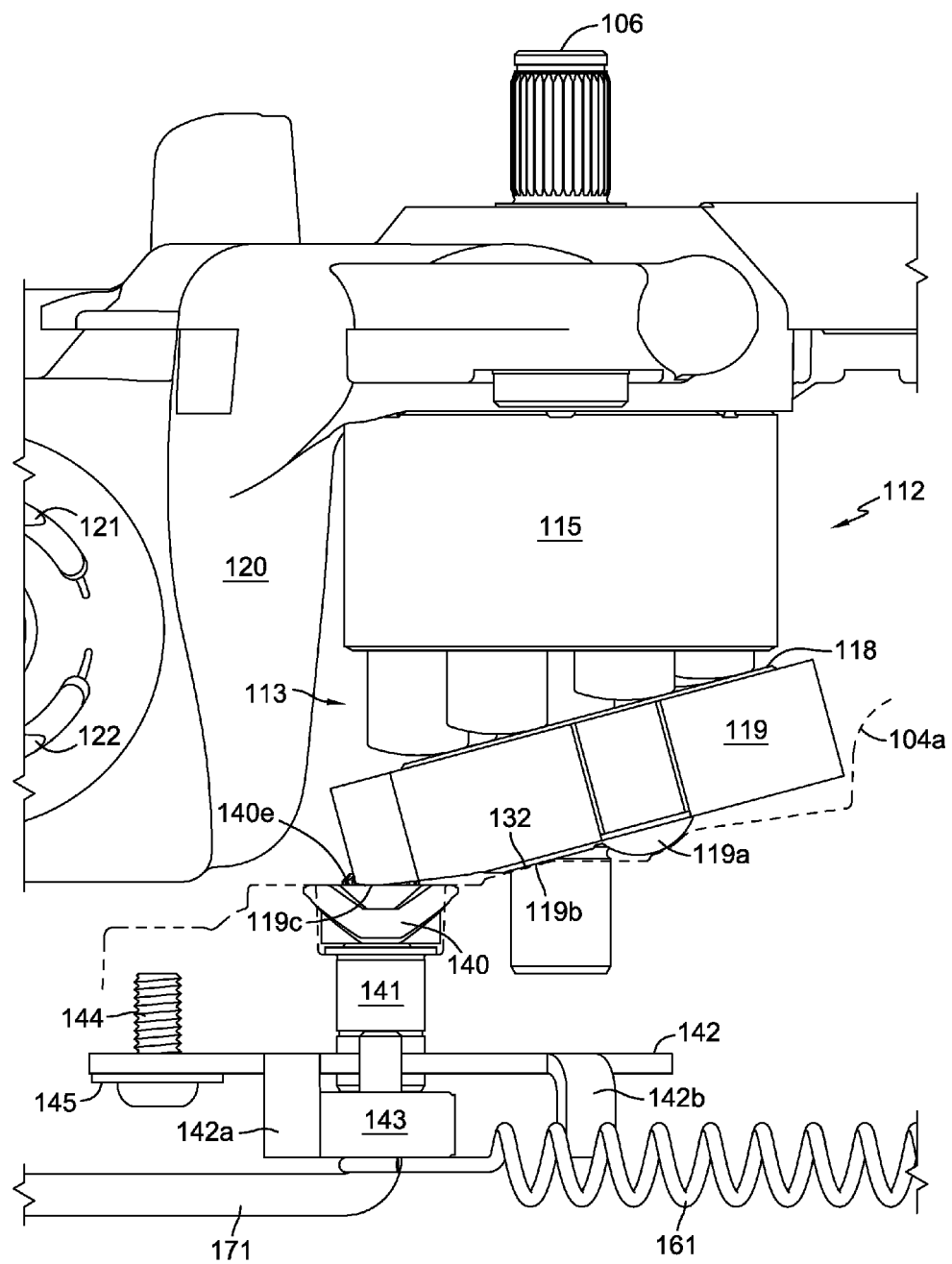
FIG. 5 is a top view of the right-side transmission of FIG. 3 illustrating details of the torque compensating control mechanism with certain transmission elements removed for clarity.

Input shaft 103 may be driven by a prime mover 110, such as an internal combustion engine or electric motor, by means of a belt and pulley system (not shown), and correspondingly drives the cylinder block 114 of hydraulic pump 111. Trunnion mounted swash plate 116, manually operable via control arm 117, controls the displacement of hydraulic pump 111. Hydraulic fluid from hydraulic pump 111 drives hydraulic motor 112 on center section 120 via integral porting 121, 122 (as shown in FIGS. 4 and 5).

Hydraulic motor 112 comprises a cylinder block 115 rotatably disposed on and in fluid communication with center section 120. A plurality of pistons 113 disposed in motor cylinder block 115 is axially displaced by the hydraulic fluid flow from hydraulic pump 111. The pistons 113 continuously engage a thrust bearing 118 seated on a first face of motor swash plate 119. The displacement of hydraulic motor 112 is controlled by the angle of motor swash plate 119, which is pivotable through a range of positions from the partial-stroke position best illustrated in FIGS. 2 and 4 to a full-stroke position illustrated in FIGS. 3 and 5. Motor swash plate 119 has an integral pivot element 119a formed on the face of motor swash plate 119 opposite the thrust bearing 118. The pivot element 119a rides in a corresponding channel 130 formed in main housing 104a. The pivot element 119a is located off-center to encourage the motor swash plate 119 to move to a full-stroke position in the event the torque compensating control mechanism 100 fails (i.e. ceases to influence the position of motor swash plate 119).

In that event, the balance of forces exerted on motor swash plate 119 by the pistons 113 is such that motor swash plate 119 is rotated to the full-stroke position. Accordingly, the hydraulic reduction between hydraulic pump 111 and hydraulic motor 112 is maximized, slowing the rotational speed of output axle 107 and providing a margin of safety.

Figure 6:
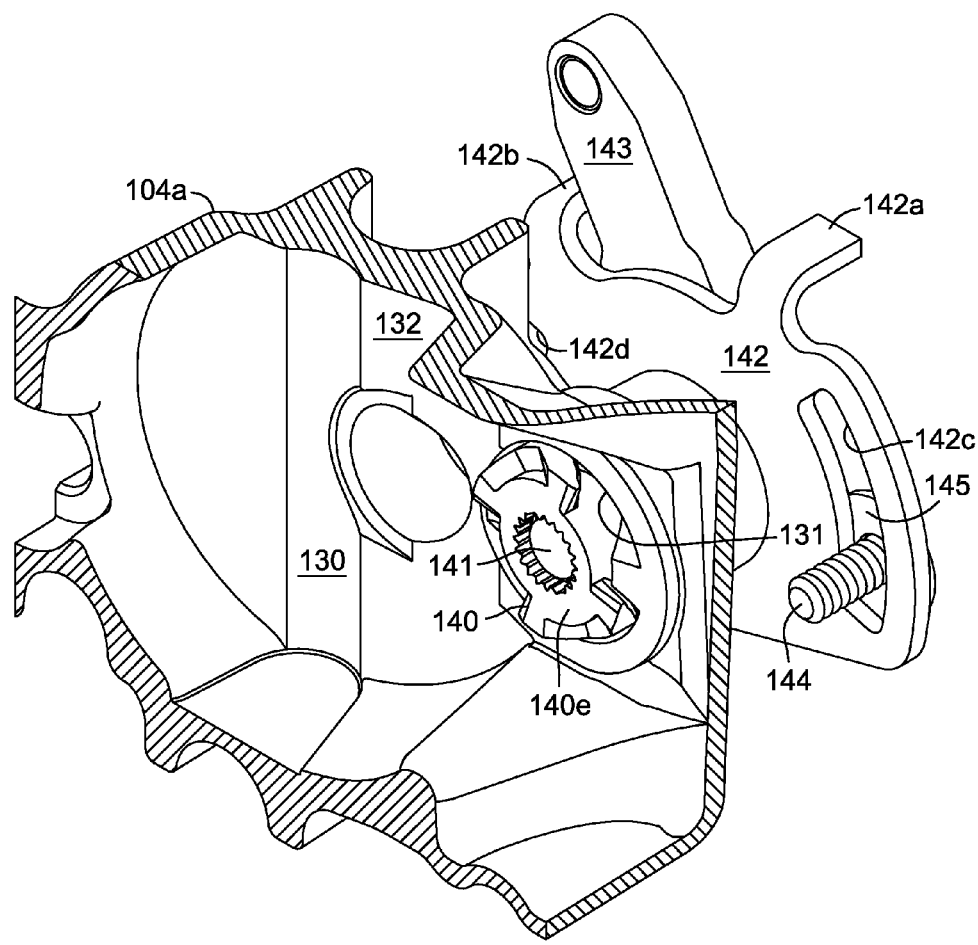
FIG. 6 is a reverse, isometric view of certain components of the hydraulic motor shift mechanism of the right-side transmission of FIG. 1, with portions of the transmission housing removed for clarity and the shift mechanism rotated to the partial-stroke position.
Figure 7:
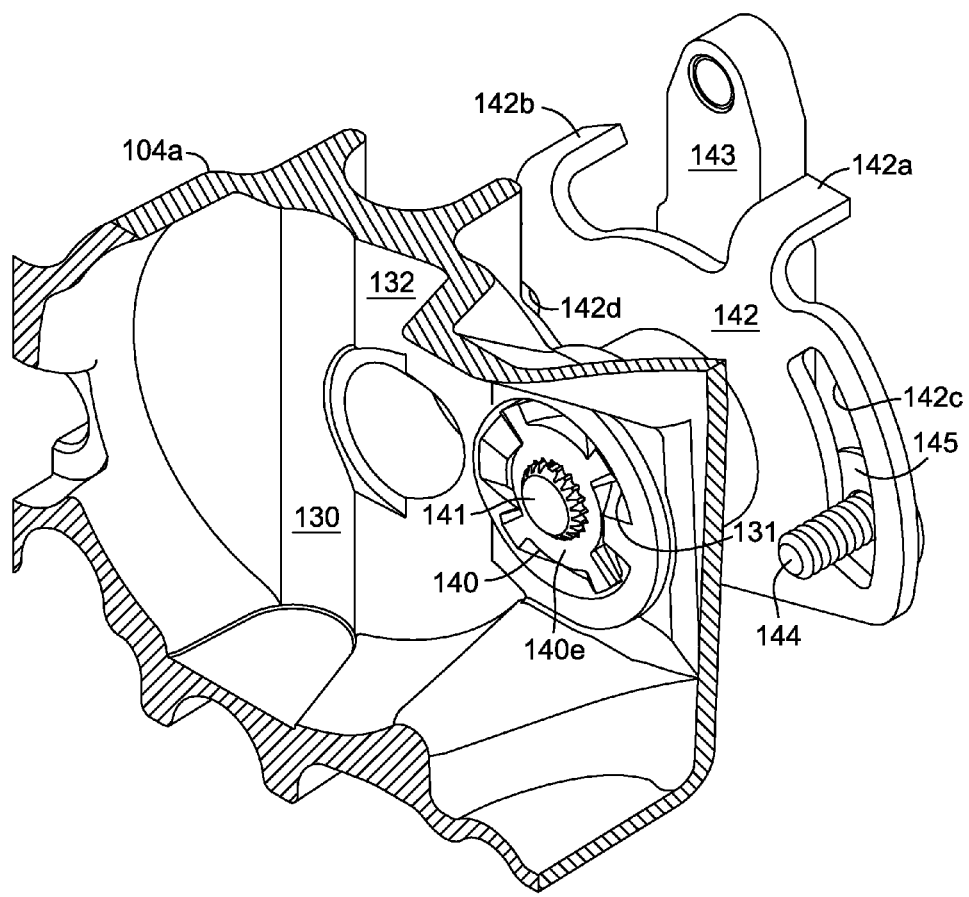
FIG. 7 is a view similar to FIG. 6, with the shift mechanism rotated to the full-stroke position.
Figure 8:
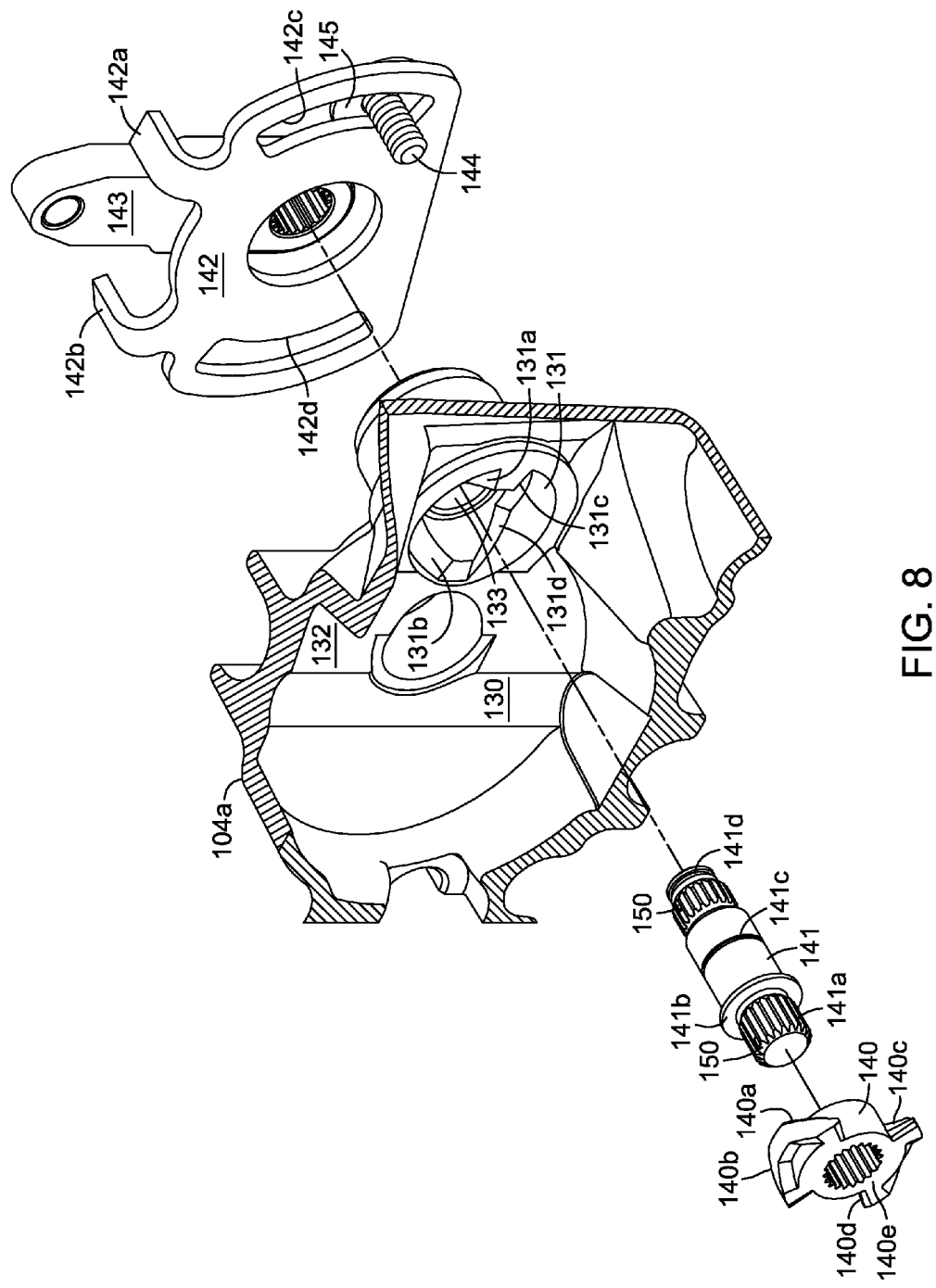
FIG. 8 is a partially exploded view of components of the hydraulic motor shift mechanism of FIG. 7.

Each transmission 101, 102 of drive system 10 has a torque compensating control mechanism 100 consisting, in part, of a cam 140 operatively engaged to motor swash plate 119, with cam 140 riding on camshaft 141. Cam 140 is slip fit onto the splines 141a of camshaft 141 and moves axially along camshaft 141 while rotationally interacting with a set of ramped surfaces 131a-131d formed in a receiving or shift pocket 131 (as best shown in FIG. 9). More specifically, a pair of opposing ramped surfaces on cam 140 (as best shown in FIG. 10), i.e. ramped surfaces 140a and 140d or ramped surfaces 140b and 140c, slidingly engage a corresponding pair of opposing ramped surfaces in shift pocket 131, i.e. ramped surfaces 131a and 131d or ramped surfaces 131b and 131c, respectively, depending on the direction of rotation of cam 140. A flange 141b locates camshaft 141 at the base of shift pocket 131, camshaft 141 passing therethrough via bore 133 (as shown in FIG. 8) to the exterior of main housing 104a. Camshaft 141 is retained in axial alignment in bore 133 by a retaining ring (not shown) installed in a retaining ring groove 141c accessible from the exterior of main housing 104a when camshaft 141 is installed. A shaft seal (not shown), as known in the art, prevents hydraulic fluid from escaping housing 104 along camshaft 141. FIGS. 4 and 6 depict the position of cam 140 along the length of camshaft 141 at the partial-stroke position corresponding to FIG. 2. FIGS. 5 and 7 depict the position of cam 140 along the length of camshaft 141 at the full-stroke position corresponding to FIG. 3. It should be noted that at full-stroke, a stop surface 119b of motor swash plate 119 adjacent pivot element 119a comes to rest against a corresponding stop surface 132 of main housing 104a. In the partial-stroke position, however, only pivot element 119a remains in contact with main housing 104a.

A shift lever 143 engages an end of camshaft 141 external to main housing 104a, and is secured there by a retaining clip 146 mated to an annular groove 141d at the external end of camshaft 141. A limiting or lockdown arm 142 having a pair of stops 142a, 142b is fastened to main housing 104a adjacent shift lever 143 by means of a lockdown screw 144 and lockdown washer 145. When appropriately set, the stops 142a, 142b correspond to the full-stroke position and the partial-stroke position, respectively, of motor swash plate 119, arresting the movement of shift lever 143 therebetween. As illustrated in FIG. 7, shift lever 143 is positioned vertically in the full-stroke position. This orientation is established by clocking features 150 integrated into the splines of the cam 140, camshaft 141, and shift lever 143 (as illustrated in FIGS. 8 and 10), that align these components to allow cam 140 to recede into shift pocket 131 when shift lever 143 is vertically oriented. The rotational position of lockdown arm 142 at installation is ideally established on a test stand that senses the rotational speed and direction of the output axle 107. Lockdown arm 142 has a pair of slots 142c, 142d that permit the use of a single part on both the left-side transmission 101 and right-side transmission 102. Lockdown screw 144 passes through lockdown washer 145 and either slot 142c or slot 142d, depending on whether transmission 101 or 102 is being set, to engage a threaded boss (not shown) in main housing 104a. This setting operation is performed in conjunction with a second test stand operation that establishes a consistent, maximum speed at the output axle 107. This second operation may be accomplished by setting the rotational position of an additional lockdown arm (not shown) that arrests the forward stroke of hydraulic pump 111 by engaging a tab 117a on control arm 117 to limit its further rotation.

It should be noted that the combination of the shift lever 143, lockdown arm 142, camshaft 141, cam 140, and motor swash plate 119 could be manually operated by a shift linkage (not shown) engaged to the shift lever 143, effectively rendering each transmission 101, 102 a two-speed drive apparatus. Such a structure is known and available in, e.g., the integrated transaxle sold by Hydro-Gear Limited Partnership under the trade name ZT-5400 Powertrain®. In such transaxles, the described shift linkage prevents motor swash plate 119 from self-adjusting with load, free from any operator control as is taught in the present application.

A support rod 160 fastened to a pair of mounting bosses 104c formed on the main housings 104a of transmissions 101, 102 provides stiffness to the drive system arrangement. A pair of bias springs 161, each attached to the support rod 160 at a first end, communicates with the respective shift levers 143 of the transmissions 101, 102 at a second end. Though the bias springs 161 are depicted as engaging the support rod 160 via a hook-and-opening type arrangement, other means of engagement known in the art, such as a groove-and-hook type arrangement could be utilized. It should be noted that bias springs 161 could also be anchored to an appropriately located vehicle frame member as opposed to support rod 160. Bias springs 161 act to position the shift levers 143 of each transmission 101, 102, and consequently their respective motor swash plates 119, in the partial-stroke position.

It should be noted that the architecture of cam 140 and shift pocket 131 are such that the partial-stroke position can be achieved by rotating the shift lever 143 clockwise or counterclockwise from the vertical, full-stroke position. As such, lockdown arm 142 may be oriented such that stop 142B serves to establish the vertical, full-stroke position of shift lever 143, and stop 142a serves to establish the partial-stroke position. In that instance, bias springs 161 would need to be oriented 180° from the direction depicted herein to continue to bias swash plate 119 to the partial-stroke position. Additional flexibility in the positioning of shift lever 143 and its direction of travel is made possible by the clocking features 150 of camshaft 141 and shift lever 143, permitting the shift lever 143 to be mounted in a downward orientation. Such flexibility may help to avoid an interference condition in a given vehicle or machine application.

FIGS. 4 and 5 best illustrate the interaction of camshaft 141, cam 140 and motor swash plate 119 during the transition of hydraulic motor 112 from the partial-stroke position to the full-stroke position as the hydraulic system load increases. FIG. 4 corresponds to the partial-stroke position for hydraulic motor 112, which is the default position for motor swash plate 119. For a given displacement of hydraulic pump 111, this positioning of motor swash plate 119 represents a low(er)-torque, high(er)-speed output as compared to the full-stroke position. The hydraulic reduction between pump 111 and motor 112 in this instance is less than that of the full-stroke position. In this position, the forces applied to motor swash plate 119 by pistons 113 are not sufficient to overcome the bias force applied to motor swash plate 119 by bias spring 161 through shift lever 143, camshaft 141, and cam 140. In a zero-turn mower, for example, this position is suitable for mowing relatively flat terrain or traveling between mowing locations. Allowing greater ground speed is beneficial under these circumstances. In this partial-stroke position, shift lever 143 rests against stop 142b, and cam 140 is at its maximum internal travel along camshaft 141. A flat face 140e on cam 140 adjacent motor swash plate 119 operatively engages a curved surface 119c of swash plate 119 (as best shown in FIGS. 4 and 5), permitting the relative movement of elements as the motor swash plate 119 transitions between positions. FIG. 6 depicts the interaction of cam 140 and shift pocket 131 in this position.

As hydraulic system pressure increases with load, the pistons 113 exert an increasing force against the thrust bearing 118 and motor swash plate 119, ultimately overcoming the bias force of bias spring 161. Curved surface 119c drives cam 140 against shift pocket 131, wherein a pair of the ramped surfaces 140a-140d of cam 140 slidingly engage a pair of the corresponding ramped surfaces 131a-131d of shift pocket 131 as previously described, causing the cam 140 to rotate further into shift pocket 131 while moving axially along the splines 141a of camshaft 141. The rotation of cam 140 causes rotation of camshaft 141 and shift lever 143. Shift lever 143 is moved away from stop 142b, against the spring force of bias spring 161 to which it is engaged.

As hydraulic system pressure continues to increase with load, the force exerted by pistons 113 against the thrust bearing 118 and motor swash plate 119 ultimately pivots motor swash plate 119 to the full-stroke position, bringing shift lever 143 into engagement with stop 142a and recessing cam 140 to its greatest extent within shift pocket 131. The positions of the various control elements at the full-stroke position are illustrated in FIGS. 5 and 7. When swash plate 119 is at full-stroke position, bias spring 161 attains its maximum extension, storing energy thereby to return motor swash plate 119 to its partial-stroke position (or to any position in its range of transient positions between the default partial-stroke position and its full-stroke position) as hydraulic system pressure decreases. This full-stroke position represents a maximum hydraulic reduction, which results in high(er) torque and low(er) speed at output axle 107 than derived from the partial-stroke position. In a zero-turn mower, for example, this position may correspond to travel up inclines or through tall grass, where greater torque is required. Any further increase in hydraulic system pressure is preferably relieved by pressure relief valves (not shown) in transmissions 101, 102 in a known manner, preventing damage or reducing wear to internal components over time.

As hydraulic system pressure decreases with a lessening load, the energy stored in bias spring 161 is released, pulling shift lever 143 away from stop 142a and rotating camshaft 141. Cam 140 is thus rotated and, acting against shift pocket 131, moves axially along camshaft 141 to pivot motor swash plate 119 toward its partial-stroke position.

Accordingly, as hydraulic system pressure varies, so too does the torque output of the transmissions 101, 102 included in drive system 10, simply and automatically adjusting torque in response to load to improve the drivability of any utility vehicle so equipped. To further improve drivability, one may link the responses of the transmissions 101, 102 under load by providing a rigid linkage 170 engaged to the shift levers 143 of each transmission 101, 102 to synchronize their responses to varying loads. As shown installed in the vehicle 180 of FIG. 11, a pivot rod 173 spans the width of vehicle frame 181, rotatably supported therein by bushing mounts 174. A pair of connecting links 172 is fixed to the pivot rod 173 at their first ends to rotate with the pivot rod 173. A connecting rod 171 links a second end of each connecting link 172 with the shift lever 143 of the respective transmission 101, 102. It should be noted that although the bias springs 161 are depicted as engaging the connecting rods 171 of each transmission 101, 102, the bias springs 161 could also directly engage an opening (not shown) on the respective shift levers or control arms 143. It should also be understood that a more basic linkage could be used where clearance permits. For example, a rigidly fixed tie rod could be extended between the two control arms 143, and one end of each of the springs 161 could be affixed to this tie rod instead of to the separate control arms 143, to accomplish this linkage of the two transmissions.

Figure 2:
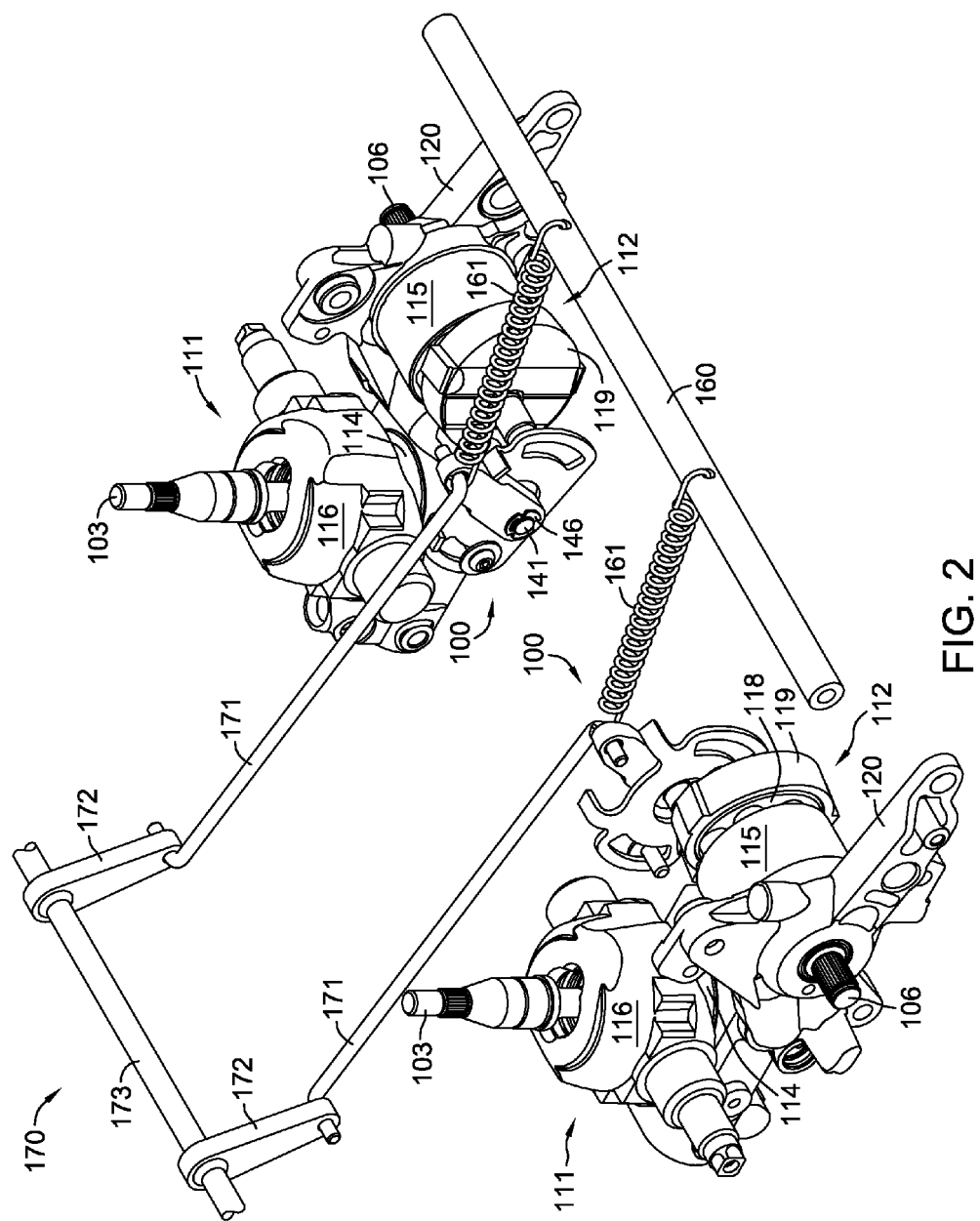
FIG. 2 is an isometric view of the drive system of FIG. 1 with the transmission housings and drive train elements removed for clarity.
Figure 3:
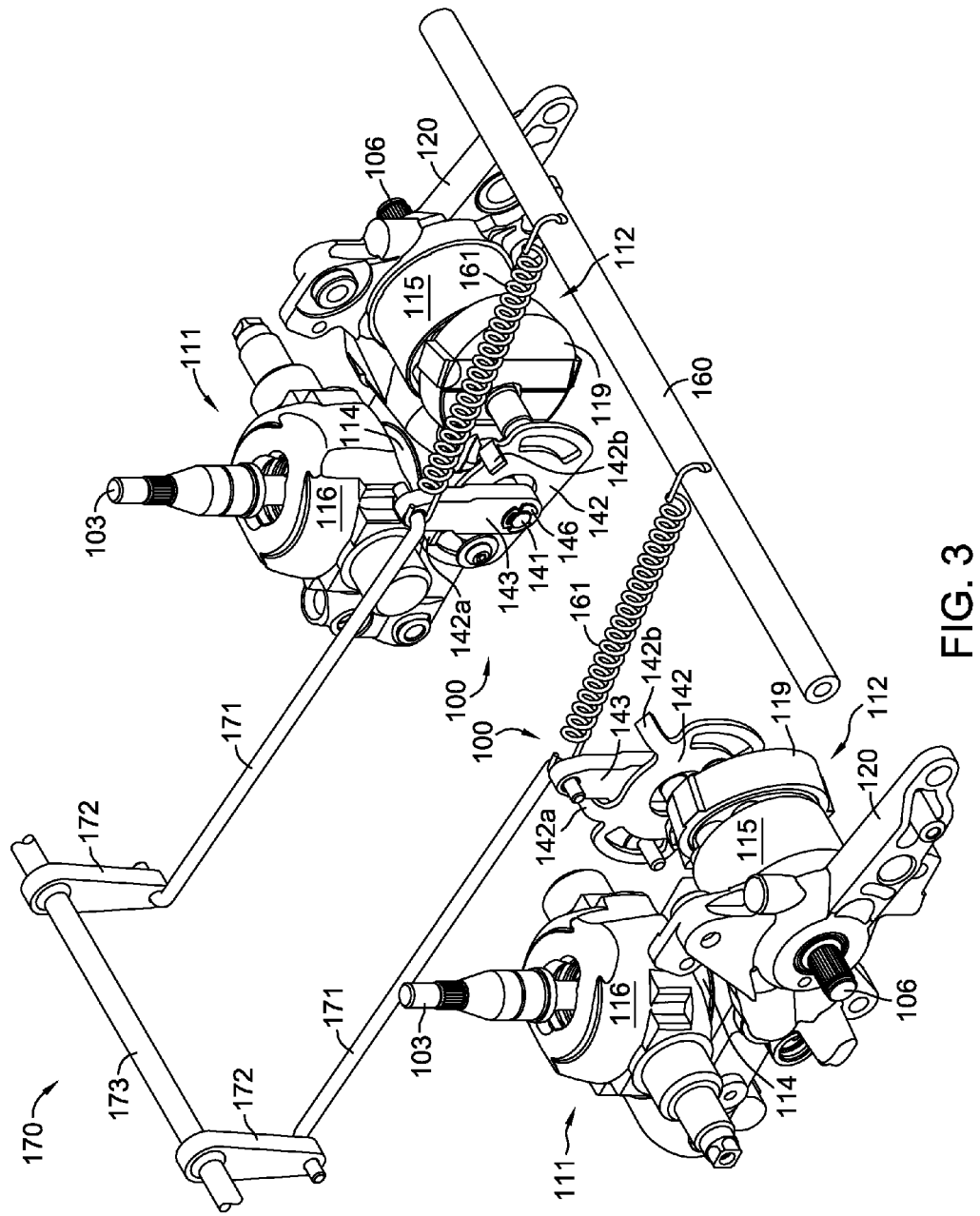
FIG. 3 is an isometric view similar to FIG. 2, illustrating the automatic torque compensating drive system self-adjusted to the high-torque, low-speed mode.

FIGS. 1 and 2 illustrate the position of the linkage 170 when the hydraulic motors 112 of transmissions 101, 102 are in partial-stroke. FIG. 3 illustrates the rotated position of the linkage 170 when the hydraulic motors 112 of transmissions 101, 102 are in full-stroke, or maximum hydraulic reduction. It should be noted that each transmission may experience different loads, e.g. when a zero-turn vehicle 180 such as that depicted in FIG. 11 laterally traverses a hillside, the loading on the downhill transmission is greater than that of the uphill transmission. As a result, the downhill transmission requires additional torque to keep the vehicle 180 tracking in a straight line across the face of the hill. In such a situation, the downhill transmission may seek to rotate its motor swash plate 119 toward the full-stroke position, while the uphill transmission may not. Absent the linkage 170, this event could cause the vehicle to turn unexpectedly, or to a greater degree than expected, as the change in relative output speeds of the two transmissions 101, 102 produces a greater turn than gravity alone. Linkage 170 synchronizes the strokes of the two hydraulic motors 112 in response to one or both of the transmissions making an adjustment in torque. Consequently, the operator of vehicle 180 may simply concentrate on the control inputs to each of the hydraulic pumps 111 via control linkages (not shown) to the respective control arms 117 of each transmission 101, 102.

Distinguishing portions of a second embodiment of a drive system are illustrated in FIGS. 12-15, where a representative transmission 201 is equipped with a fully internal, torque compensating control mechanism 200. In this second embodiment, camshaft 241 does not extend outside main housing 204a, in contrast to the previously-described torque compensating control mechanism 100 of drive system 10, where the camshafts 141 of transmissions 101, 102 extend outside main housing 104a. Accordingly, a shift lever, external bias spring, and rigid linkage are not present. Though a single, left-side transmission 201 is depicted, and may be used in cooperation with utility equipment (not shown) requiring a single output, it is also to be understood that a corresponding right-side transmission having substantially identical features may complete a drive system similar to the drive system 10 depicted in FIG. 1.

The internal, torque compensating control mechanism 200 consists of a camshaft 241 having a radial flange 241b approximately midway along its longitudinal axis, dividing the camshaft into two portions; a first portion 241e that resides in a bore 233 connecting a receiving or shift pocket 231 to the exterior of main housing 204a, and a second portion 241a that receives a cam 240 and a wave spring 261 disposed between the radial flange 241b and cam 240. Unlike the splined interface of camshaft 141 and cam 140, camshaft 241 and cam 240 have smooth mating surfaces 241a, 240f, it being unnecessary to rotate camshaft 241. A retaining ring 247, or similar element, retains cam 240 and wave spring 261 on camshaft 241, engaged there to a retaining ring groove 241d. This cam assembly 249 is preferably assembled prior to insertion through shift pocket 231 and bore 233. Radial flange 241b axially positions the cam assembly 249 within shift pocket 231 and bore 233. A second retaining ring 248 interfaces with a corresponding groove 241c on the first portion 241e of camshaft 241 protruding from bore 233, retaining it therein. A sealing plug 251, such as a rubber coated metal seal, is press fit into the stepped counter-bore 234 leading to bore 233, sealing main housing 204a.

Figure 13:
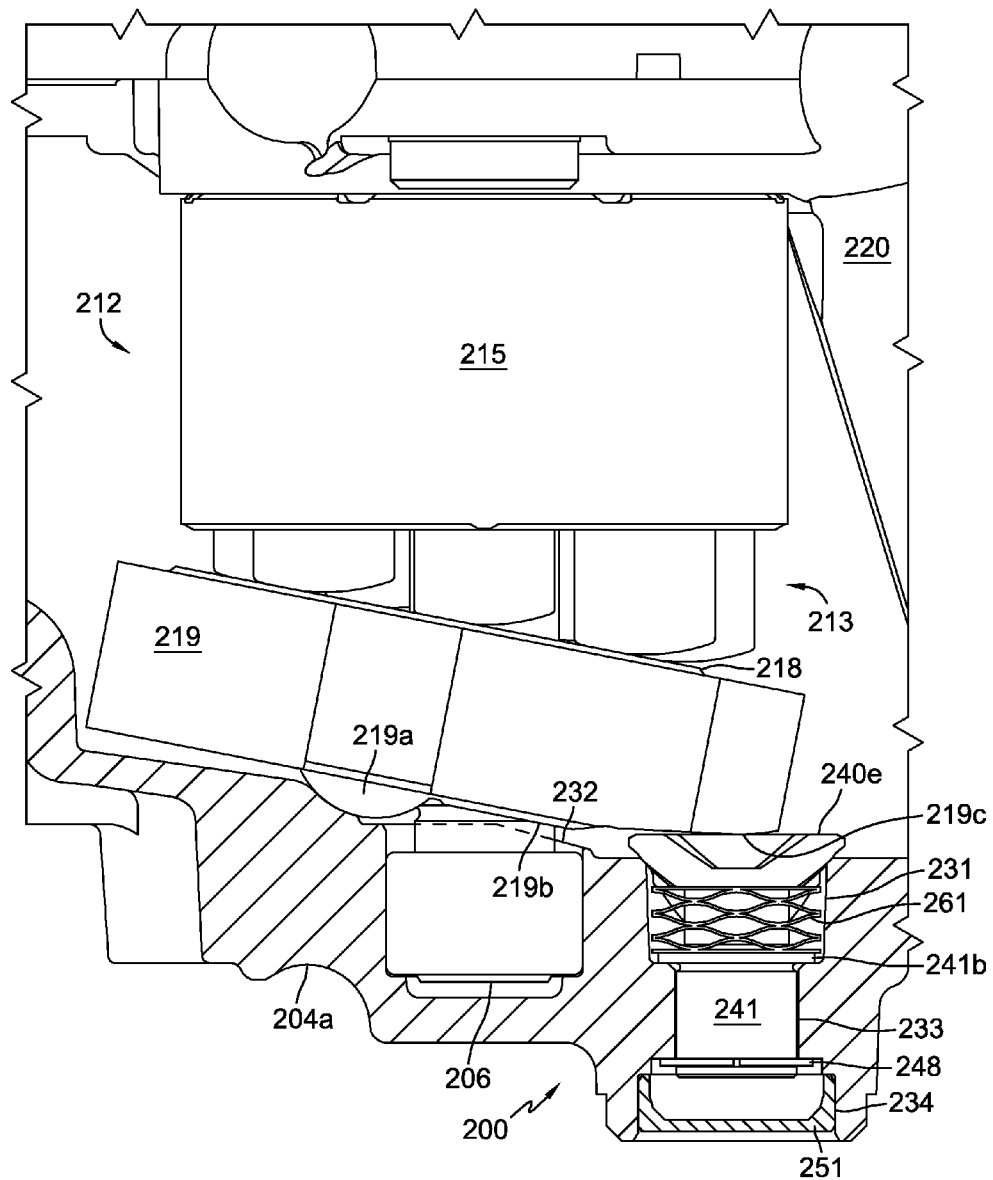
FIG. 13 is a partial section view of certain components of the hydrostatic transmission of FIG. 12 along the line 13-13, with certain elements shown whole for clarity and the hydraulic motor in the partial-stroke position.
Figure 14:
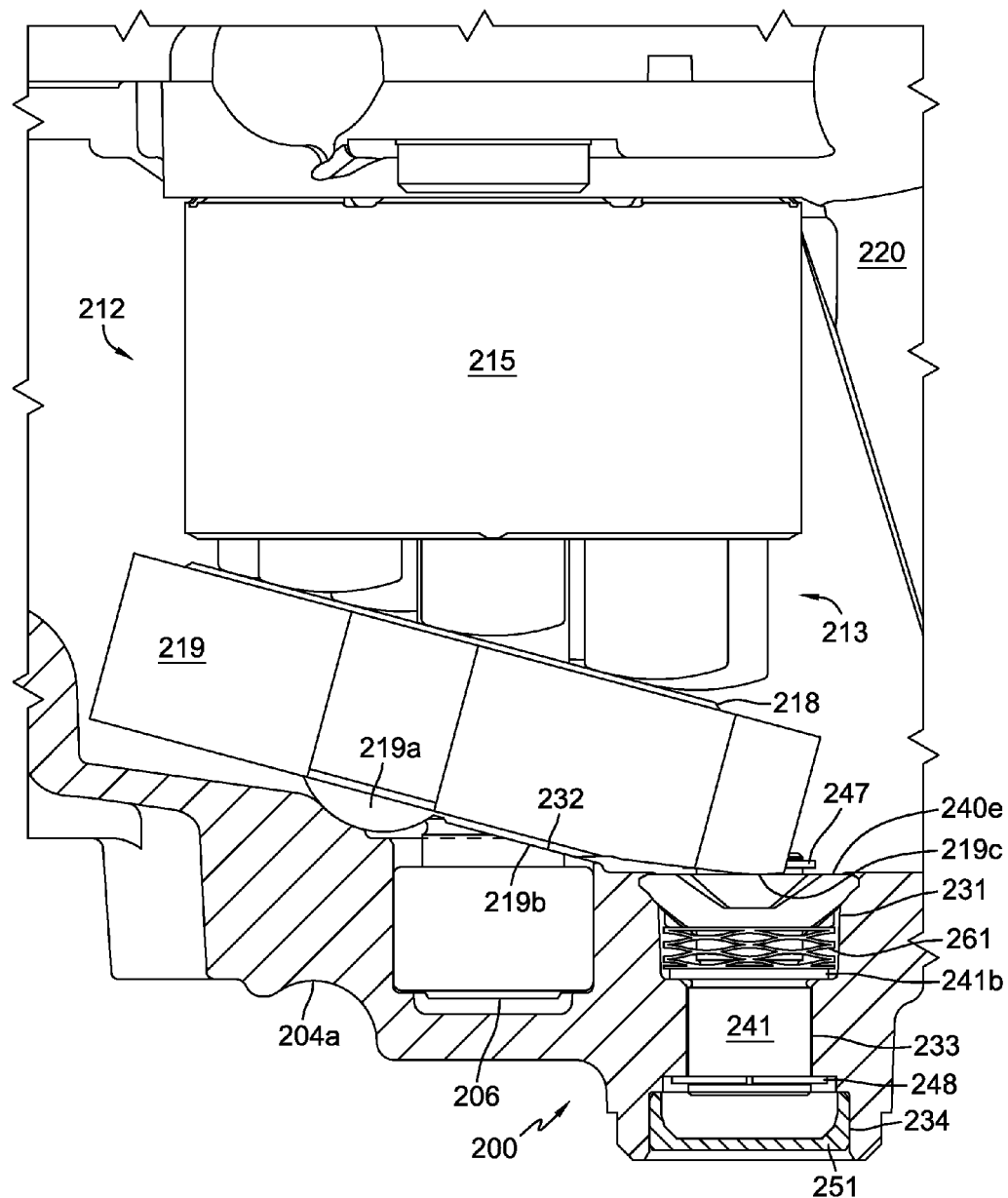
FIG. 14 is a partial section view similar to FIG. 13, with the hydraulic motor in the full-stroke position.
Figure 15:
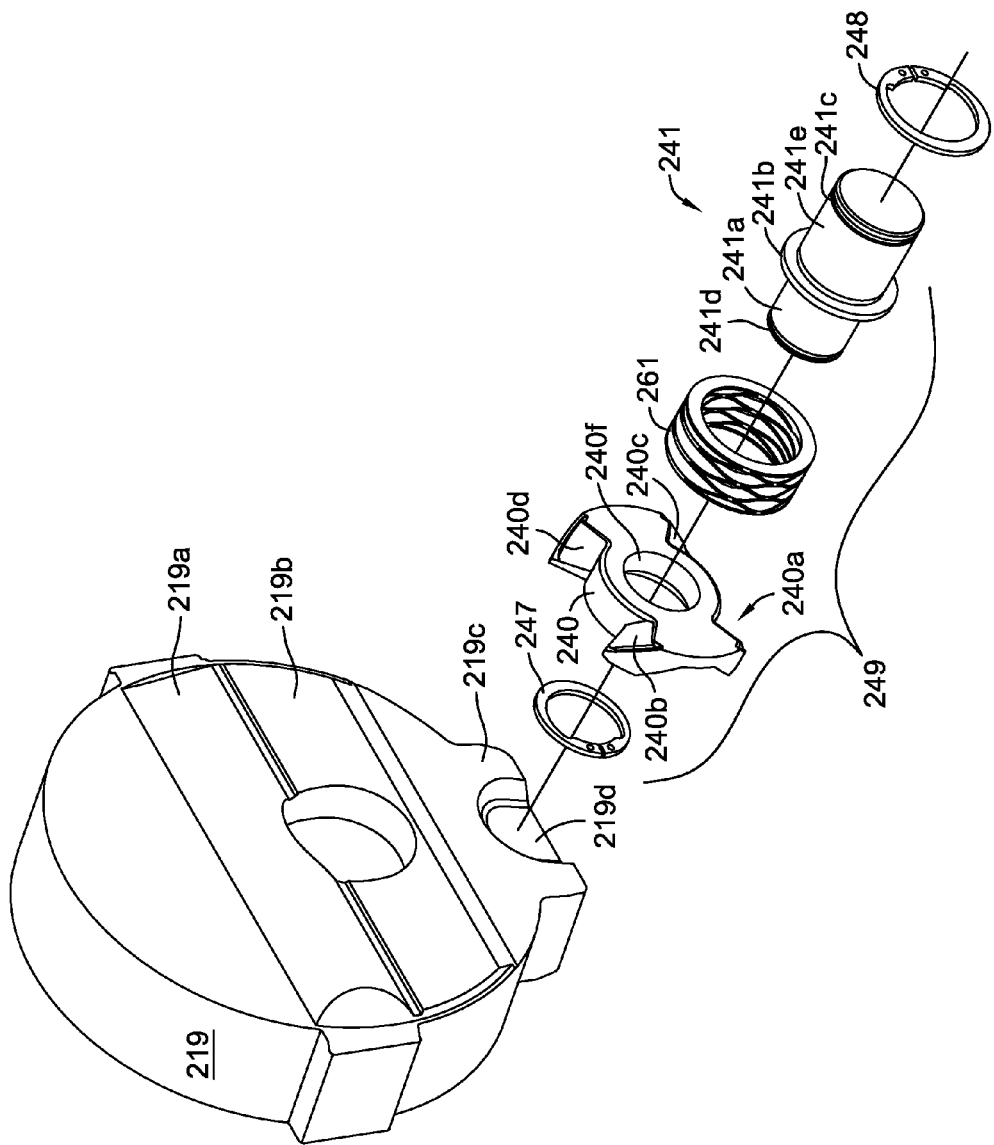
FIG. 15 is an exploded view of the internal torque compensating control mechanism and the swash plate of the hydraulic motor of FIG. 14.

FIGS. 13 and 14 depict the partial-stroke and full-stroke positions, respectively, of motor swash plate 219. The interaction of motor swash plate 219, cam 240, and shift pocket 231 in response to changes in hydraulic system pressure, i.e. changing loads, is similar to that previously described for the torque compensating control mechanisms 100 of drive system 10. Wave spring 261 provides the bias force previously supplied by external bias spring 161, exerting force against the radial flange 241b of camshaft 241 and against cam 240. At a hydraulic system pressure insufficient to overcome the spring force of wave spring 261, motor swash plate 219 resides in the partial-stroke position, its curved surface 219c operatively engaged to a flat face 240e of cam 240. In the partial-stroke position, only pivot element 219a of swash plate 219 is in contact with main housing 204a.

As hydraulic system pressure increases to a point where the spring force of wave spring 261 is exceeded, the stroke angle of swash plate 219 begins to increase, causing cam 240 to be driven into shift pocket 231 as wave spring 261 is compressed. As previously described for the interaction of cam 140 and shift pocket 131, a pair of opposed ramped surfaces from the set of ramped surfaces 240a-240d on cam 240 slidingly engage a pair of the corresponding ramped surfaces (not shown) in shift pocket 231 to rotate cam 240 as it is driven deeper into shift pocket 231 with increasing hydraulic system pressure. As hydraulic system pressure continues to build in response to increased load, the full-stroke position of FIG. 14 is achieved with cam 240 receding a maximum distance into shift pocket 231, wave spring 261 reaching maximum compression, and stop surface 219b of swash plate 219 coming to rest against main housing stop surface 232. This position represents the maximum hydraulic reduction between a hydraulic pump (not shown) in transmission 201 and hydraulic motor 212, and therefore, a high(er) torque, low(er) speed state for transmission 201. A depression 219d adjacent curved surface 219c of swash plate 219 provides clearance for the end of camshaft 241, preventing contact between the two elements at the full-stroke position.

When hydraulic system pressure begins to decrease with decreasing load, the energy stored in the compressed wave spring 261 is released, driving cam 240 partially out of shift pocket 231 and, ultimately, returning swash plate 219 to the partial-stroke position. This position represents a low(er) torque, high(er) speed state for transmission 201. It should be noted that for internal, torque compensating control mechanism 200, without any need to rotate camshaft 241, shift pocket 231 and cam 240 may be simplified to a piston and straight bore design. (Even with the cam design, once cam 240 recedes its maximum distance into shift pocket 231, it may thereafter just slide axially along the smooth exterior of camshaft 241, sans rotation, as torque is regulated.) Furthermore, bore 233 need not open to the external side of main housing 204a, eliminating a potential leak path for hydraulic fluid and the need for sealing plug 251. As currently illustrated, however, a single design for main housings 104a, 204a beneficially accommodates both torque compensating control mechanisms 100, 200.

As previously mentioned, while torque compensating control mechanism 200 has been illustrated as applied to a transmission 201 having a single output axle, as part of a two transmission drive system, the device could also be employed in a drive system utilizing a single transmission driving a pair of output axles, such as that shown in U.S. Pat. Nos. 7,373,871 and 7,210,294.

While specific embodiments of the invention have been described in detail, it will be appreciated by those skilled in the art that various modifications and alternatives to those details could be developed in light of the overall teaching of the disclosure. Accordingly, the particular arrangements disclosed are meant to be illustrative only and not limiting as to the scope of the invention.

What is claimed is:

1. A torque control mechanism for adjusting a torque level of an output of a transmission from a low-torque value to a high-torque value, wherein the transmission includes a hydraulic motor having an adjustable swash plate, said torque control mechanism comprising:
   a camshaft;
   a cam member slidingly engaged to the camshaft and configured to operatively engage the swash plate; and
   a biasing member operatively engaged to the cam member to bias the swash plate to a biased position.

2. The torque control mechanism of claim 1, wherein the biasing member comprises a spring.

3. The torque control mechanism of claim 1, wherein the biasing member is disposed inside a housing in which the hydraulic motor is located.

4. The torque control mechanism of claim 1, wherein the cam member is slip fit onto the camshaft.

5. The torque control mechanism of claim 1, wherein the output of the transmission is adjusted toward the high-torque value as the load experienced by the transmission increases.

6. The torque control mechanism of claim 5, wherein the output of the transmission is adjusted toward the low-torque value as the load experienced by the transmission decreases.

7. The torque control mechanism of claim 1, wherein the biased position corresponds to the low-torque value of the output of the transmission.

8. A drive system comprising:
   a transmission disposed in a housing and producing an output; and
   a torque control mechanism engaged to the transmission and configured to adjust a torque level of the output between a low-torque value and a high-torque value, the torque control mechanism including means for biasing the torque level of the output to the low-torque value, and the torque control mechanism automatically adjusts the output of the transmission in response to load.

9. The drive system of claim 8, wherein the means for biasing comprises a spring.

10. The drive system of claim 9, wherein the spring is disposed in a receiving pocket of the housing.

11. The drive system of claim 8, wherein the transmission comprises an axial piston hydraulic motor having a swash plate pivotable between a first position corresponding to the low-torque value and a second position corresponding to the high-torque value.

12. The drive system of claim 11, wherein the swash plate comprises an integrally formed pivot surface that rides in a corresponding channel formed in the housing.

13. The drive system of claim 11, wherein the means for biasing comprises a spring, and the drive system further comprises a cam member operatively engaged to the swash plate and the spring, wherein the cam member acts upon the swash plate under motive force from the spring to drive the swash plate to the first position, and wherein the cam member is forced into a receiving pocket in the housing by the swash plate as the swash plate moves to the second position.

14. The drive system of claim 13, wherein the cam member is fixed to a shaft extending outside of the housing to engage the spring via a control arm.

15. The drive system of claim 8, wherein the output of the transmission drives at least one output axle.

16. The drive system of claim 15, wherein the torque control mechanism is disposed entirely internal to the housing.

17. A drive system comprising:
   a hydraulic motor disposed in a housing and comprising a cylinder block having a plurality of pistons disposed therein, and an adjustable swash plate engaged to the plurality of pistons; and
   a torque control mechanism engaged to the swash plate and configured to move the swash plate between a first position that corresponds to a low-torque value of the output of the hydraulic motor and a second position that corresponds to a high-torque value of the output of the hydraulic motor.

18. The drive system of claim 17, further comprising means for biasing the swash plate to a biased position.

19. The drive system of claim 18, wherein the means for biasing the swash plate comprises a spring, and the biased position corresponds to the first position.

20. The drive system of claim 19, wherein the spring is disposed inside the housing.

21. The drive system of claim 17, further comprising at least one output axle disposed in the housing and driven by an output of the hydraulic motor.

22. The drive system of claim 21, wherein the torque control mechanism is disposed entirely internal to the housing.

23. A drive system comprising:
   a first transmission disposed in a first housing and producing a first output;
   a first torque control mechanism engaged to the first transmission and configured to adjust a torque level of the first output between a low-torque value to a high-torque value, the first torque control mechanism including a first biasing member configured to bias the torque level of the first output to the low-torque value;
   a second transmission disposed in a second housing and producing a second output;
   a second torque control mechanism engaged to the second transmission and configured to adjust a torque level of the second output between the low-torque value to the high-torque value, the second torque control mechanism including a second biasing member configured to bias the torque level of the second output to the low-torque value; and
   an operative linkage between the first torque control mechanism and the second torque control mechanism configured to cause the torque level of the first output and the torque level of the second output to be substantially similar.

\* \* \* \* \*